Patented Nov. 6, 1928.

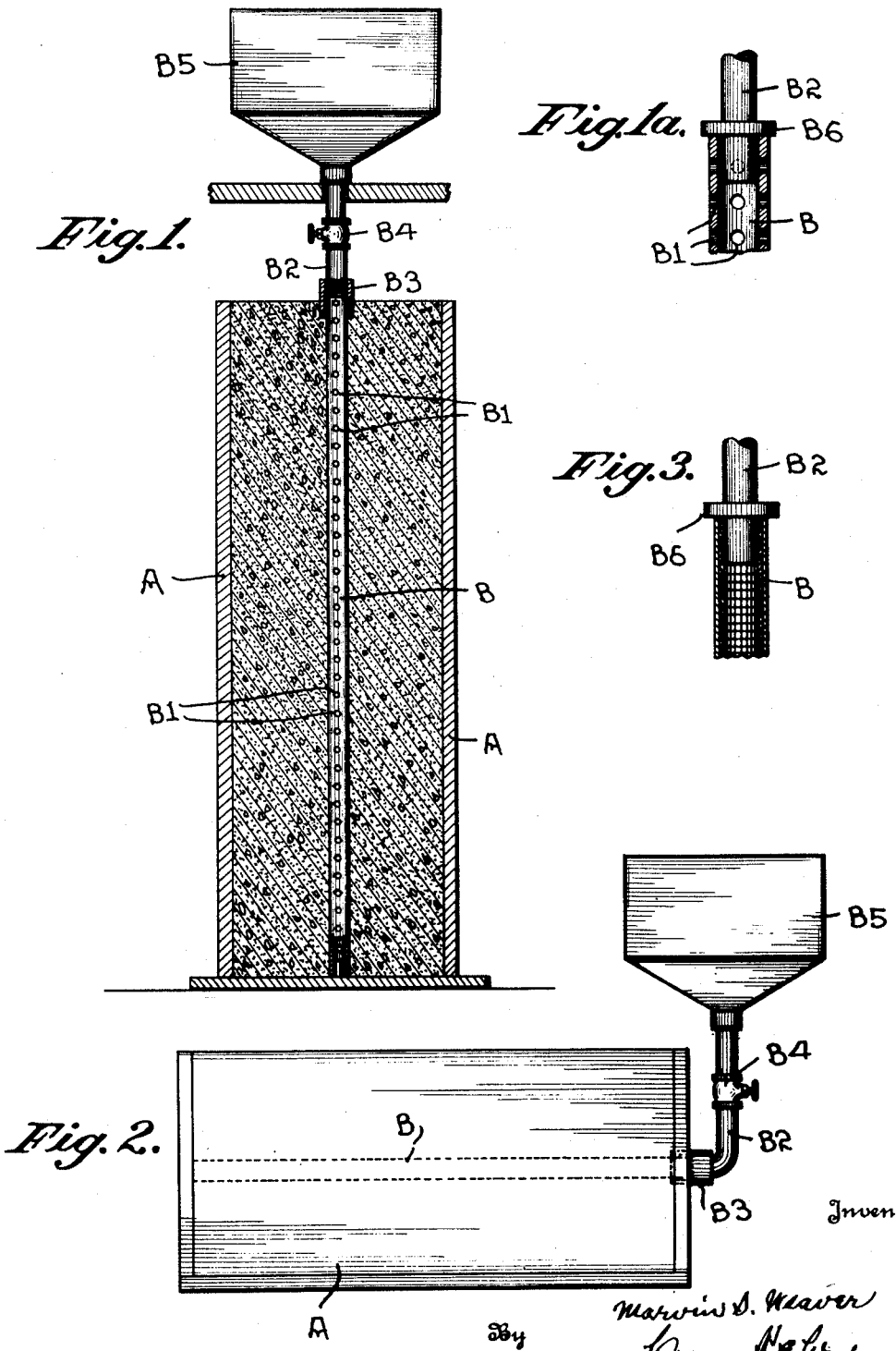

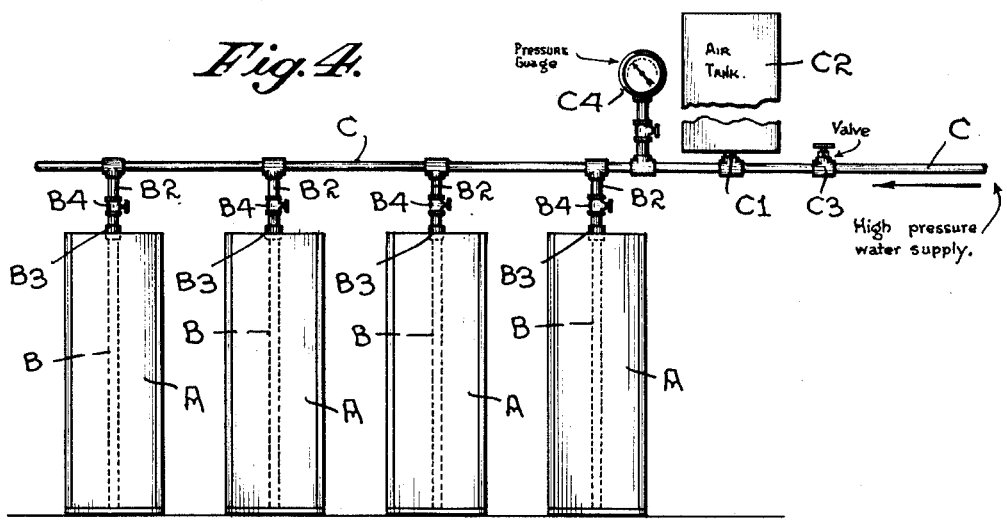
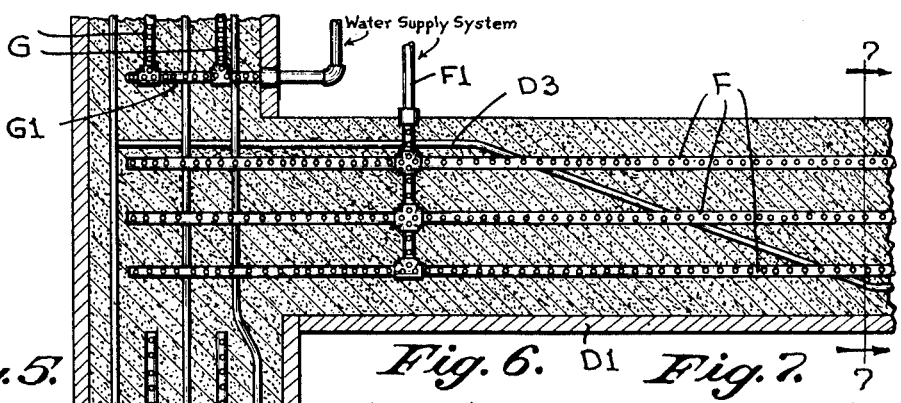
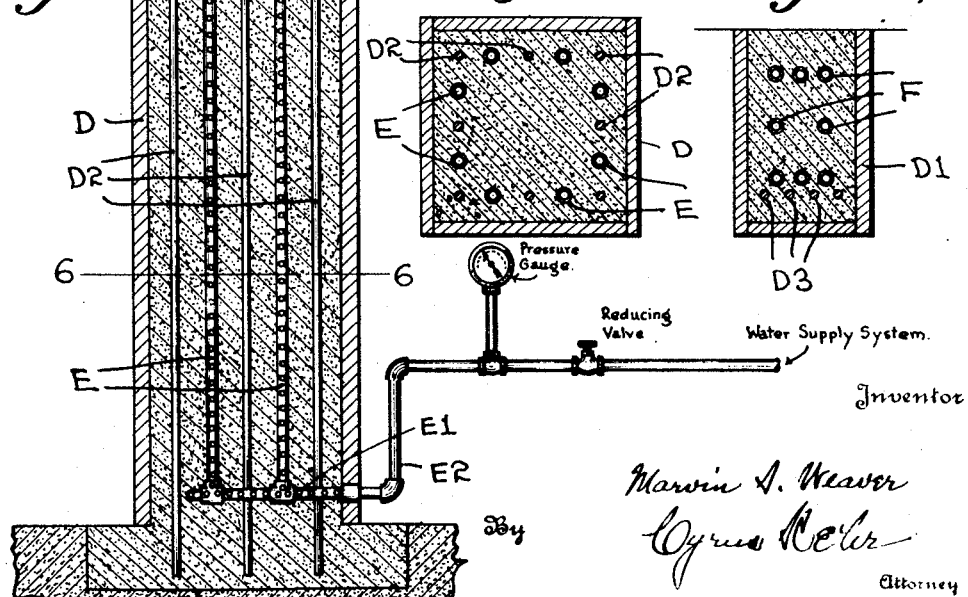

1,690,467

UNITED STATES PATENT OFFICE.

MARVIN S. WEAVER, OF SOUTHERN PINES, NORTH CAROLINA.

METHOD OF AND APPARATUS FOR MOLDING AND CURING CONCRETE.

Application filed November 9, 1925. Serial No. 68,023.

This invention relates to the making of concrete and particularly to the treating of the concrete mixture with water while the mixture is setting or hardening.

The chief object of the invention is to provide for delivering water into the interior of a mass of concrete mixture placed for setting, the water permeating outward through the mass of mixture and delivery of water into the mass being made while such outward permeation or flow proceeds.

Various means will be described to adapt the interior of the mixture mass to receive water and means will be described for delivering the water into the mass. In the preferred form, water-conducting means will extend from a source of water supply under pressure into the mixture mass which has been placed for setting, the part or parts of the conducting means within the mass being perforated or otherwise formed for permitting movement of the water outward into and through the mass.

In the accompanying drawings,

Fig. 1 is an upright sectional elevation showing a mold and water-delivery means in position;

Fig. 1ª is a detail view of a pipe coupling;

Fig. 2 is a view similar to Fig. 1, the mold being in the horizontal position;

Fig. 3 is a detail view of the same coupling with another form of pipe;

Fig. 4 is a diagrammatic elevation showing four molds and water delivery pipes leading into those molds and to a source of water supply under pressure, the pipe adjacent the molds being provided with a cut-off valve, an air tank, and a pressure gage;

Fig. 5 is an upright section of a column and a beam which are to form parts of a building;

Fig. 6 is a horizontal section on the line, 6—6, of Fig. 5;

Fig. 7 is an upright section on the line, 7—7, of Fig. 5.

Referring first to Fig. 1, A is an upright mold. B is an upright tube or pipe located in the mold and having any number of perforations, B¹, for the passing of water from the interior of the tube. The upper end of this tube extends into a coupling, B³. From that coupling a pipe, B², extends upward to an elevated funnel or tank, B⁵, which is to contain water. On the tube between the upper end of the mold and the tank is a cut-off valve, B⁴, by which the flow of water from the tank into said pipe may be regulated. The space within the mold is to be filled with a concrete mixture and allowed to remain during setting. During the setting period water is to be allowed to flow downward from the tank into the pipe, B, and through the perforations, B¹, and slowly permeate the mixture mass.

At the beginning of the setting period, the valve is to be closed or so nearly closed as to allow the passing of only a small quantity of water. With the gradual setting of the mass, the valve is to be opened more and more to allow more and more water to enter the pipe and to increase the pressure on the water in the pipe, whereby the movement of the water outward through the mixture mass will be facilitated. When the setting period has ended, the pipe, B, is to remain in the mass, the pipe, B², being uncoupled.

The pipe, B, may be any ordinary metal pipe sufficiently strong to resist inward pressure of the concrete mixture. Thus this pipe may be made of thin sheet metal with a coupling, B³, attached. Fig. 1ª shows this coupling made by merely inserting the upper port of the pipe, B², into the pipe, B. The pipe, B², may have a circumferential shoulder, B⁶, resting on the upper end of the pipe, B.

The pipe, B, may be formed of perforated pasteboard treated with any water proof material. This pipe may also be made of wire netting or any other material which is sufficiently strong to resist inward pressure of the mixture mass and which will receive water and allow it to move outward into the mixture. A coarse wire netting tube might be surrounded with a cloth covering which is woven closely enough to compel slow outward moving of water from the tube. That cloth or the wire netting of sufficiently small mesh might be covered with any coating slowly soluble in water and adapted to prevent or nearly prevent outward flow of water until there is such elapse of time as is needed for dissolving said coating material, the outward pressure of the water at the beginning of the setting of the mixture being thus controlled. The tube, B, might also be composed of a section of bamboo or similar plant stem.

It is to be understood that if the mold, A, is of large cross section, a plurality of tubes, B, suitably connected with a source of water supply may be placed into the mold.

In Fig. 2, the mold, A, is placed horizontally and the pipe, $B^2$, is turned upward to support the tank, $B^5$.

In Fig. 4, four molds, A, are placed in a horizontal group and each of these molds has a pipe, $B^2$, connected to a horizontal pipe, C, leading to a water supply under pressure. On each pipe, $B^2$, is a cut-off valve, $B^4$. Above a part of the pipe, C, approaching the group of molds is an air tank, $C^2$, which is connected to said pipe by a branch pipe, $C^1$. On the pipe, C, at the side of the banch pipe, $C^1$, opposite the group of molds is a valve, $C^3$. On the pipe, C, between the pipe, $C^1$, and the group of molds is a pressure gage, $C^4$.

Each of the four molds, A, A, is provided with pipes, B, as already described in connection with Fig. 1. When these molds have been charged ready for setting, the valves, $B^4$, are to be opened. Then the valve, $C^3$, is to be opened sufficiently to allow water to pass to the branch pipe, $C^1$, and into the air tank, $C^2$, and into the pressure gage and into the pipes, $B^2$, and B, until the gage indicates the pressure which is to be applied to the water in the pipes, B, of the molds at the beginning of the setting of the mass. Then the valve, $C^3$, is to be closed. The air in the air tank will form a cushion. This tank may be of sufficient capacity to hold enough water to supply the molds a considerable time. Thereafter, from time to time, the valve, $C^3$, is to be opened for the admission of more water to raise the water pressure in the molds to the desired degree. If the pressure from the source of water supply is not too high, the valve, $C^3$, may be left open.

Referring now to Figs. 5, 6 and 7, D is an upright mold for forming a column which is to form part of a building and $D^1$ is a mold for forming a beam having one end joined to said column. $D^2$ are ordinary reinforcing rods placed in the mold, D, and $D^3$ are ordinary reinforcing rods placed in the mold, $D^1$. Perforated pipes, E, are placed upright in the part of the column below the beam mold, $D^1$. The lower ends of said pipes are connected by a horizontal pipe, $E^1$, which is connected to a pipe, $E^2$, leading to a source of water supply which may be of an ordinary city water supply system. In the beam mold are horizontal perforated pipes, F. These pipes also extend into the column mold. A pipe, $F^1$, is connected with the pipes, F, and with a source of water supply. Above the pipes, F, perforated pipes, G, are placed upright in the column mold, D. A pipe, $G^1$, connects the lower ends of the pipes, G, and leads to a source of water supply.

The pipes, $E^2$, $F^1$ and $G^1$, are each to be provided with a valve and a pressure gage, if so desired. When this column mold and the beam mold have been filled with the concrete mixture, the water is to be turned into the pipes, E, F and G, in the manner already described in connection with Fig. 1, the water pressure being varied as the settitng of the mixture mass progresses, the pressure being slight while the mixture is still soft and not adapted to resist pressure exerted by the water in the perforated pipes.

It will be noted that two sets of upright pipes are put into the column mold. That aids equalizing pressure. If high pipes were used, the water pressure in the upper and the lower parts of the pipes would be unequal to an objectionable degree, the pressure in the lower ends of the pipes being excessive.

In all these cases, a perforated pipe or similar member constitutes a receptacle for receiving and delivering water, said receptacle being open for connection with means for inserting water into said rceeptacle.

When the water receiving and delivering pipe which is placed into the mold is composed of metal, it will serve as a reinforcing member, in Figs. 5, 6 and 7, the rods, $D^2$ and $D^3$, and the pipe, E, F and G together constitute reinforcing means for the concrete.

By trial I have found that, as the end of the setting period approaches, the water pressure may be much increased. I have also found by trial that giving the mixture this ample supply of water during the greater part of the setting period causes greater and more uniform hardening, and consequent strengthening of the concrete, than can be attained by the ordinary means of slowly setting with water applied externally. In other words, the superior quality of the concrete obtained by my method amply compensates for the use of the mechanism required. Furthermore, by this method, any concrete job can be put through the setting period with practically no labor. When the water connection has been made with the pipes in the molds, the job can be left to itself excepting for occasional adjustment of water flow. Columns, pillars, abutments, slabs, paving, etc., may be thus constructed without the labor of external water treatment and protection against premature drying.

I claim as my invention:

1. The herein described method of making a concrete structure, which method consists in mixing the constituents and placing them for setting and enclosing in the mass thus formed means for receiving and delivering water into the interior of said mass, and placing water under pressure into said mass, said pressure exceeding gravity pressure due to height of water in said mass, whereby water permeates outward through said mass, substantially as described.

2. The herein described method of making a concrete structure, which method consists in mixing the constituents and placing them for setting and enclosing in the mass thus formed means for receiving and delivering water into the interior of said mass, and placing water under pressure into said means and varying said pressure, said pressure exceeding gravity pressure due to height of water in said mass, whereby water permeates outward through said mass, substantially as described.

3. The herein described method of making a concrete structure, which method consists in mixing the constituents and placing them for setting and enclosing, at different elevations, in the mass thus formed means for receiving and delivering water into the interior of said mass, and placing water into said receiving and delivering means under pressure exceeding gravity pressure, whereby water permeates outward through said mass, substantially as described.

4. The herein described method of making a concrete structure, which method consists in mixing the constituents and placing them for setting and enclosing, at different elevations, in the mass thus formed, means for receiving and delivering water into the interior of the mass, and placing water under pressure in said receiving and delivering means and varying the pressure, said pressure exceeding gravity pressure due to height of water in said mass, substantially as described.

5. The herein described method of making a concrete structure which method consists in mixing the constitutents and placing them for setting and placing the interior of the mass thus formed into communication with a source of water supply under pressure greater than desired in said means and reducing said pressure between said source and the mass, substantially as described.

6. The herein described method of making a concrete structure, which method consists in mixing the constituents and placing them for setting and forming in the mass a space open to receive water and communicating with the mass, then placing water into said space and progressively adding pressure to said water, said pressure exceeding gravity pressure due to height of water in said mass, substantially as described.

7. The herein described method of making a concrete structure, which method consists in mixing the constituents and placing them for setting and then introducing water into the interior of the mixture at different elevations and under pressure exceeding gravity pressure and allowing said water to permeate outward through the mixture, substantially as described.

8. In a concrete molding apparatus, the combination of retaining walls forming a chamber, and water receiving and delivering means including soluble material and located in said chamber and communicating with the exterior, substantially as described.

9. In a concrete molding apparatus, the combination of retaining walls forming a chamber, a laterally-apertured tube, and soluble coating on said tube, substantially as described.

In testimony whereof I have signed my name, this 27th day of October, in the year one thousand nine hundred and twenty-five.

MARVIN S. WEAVER.